United States Patent [19]
Khan et al.

[11] Patent Number: 5,482,367
[45] Date of Patent: Jan. 9, 1996

[54] WHISKING DEVICE WITH ROD AND PLURAL TORROIDAL COILS

[76] Inventors: Kameel I. F. Khan; Julia Randell, both of 30 Ethelden Road, London, England, W12 7BG

[21] Appl. No.: 193,120

[22] PCT Filed: Jun. 14, 1993

[86] PCT No.: PCT/GB93/01258

§ 371 Date: Oct. 5, 1994

§ 102(e) Date: Oct. 5, 1994

[87] PCT Pub. No.: WO93/25135

PCT Pub. Date: Dec. 23, 1993

[30] Foreign Application Priority Data

Jun. 12, 1992 [GB] United Kingdom ............. 9212565
Mar. 9, 1993 [GB] United Kingdom ............. 9304785

[51] Int. Cl.$^6$ ............................................. A47J 43/10
[52] U.S. Cl. ................... 366/129; 416/70 R; 416/227 R
[58] Field of Search ........................... 366/129, 130, 366/342, 343; 416/69, 70 R, 76, 227 R; 15/141.1, 141.2; D7/376–378, 380, 412, 688, 690

[56] References Cited

U.S. PATENT DOCUMENTS

| 647,341 | 4/1900 | Tutt ................................. 366/343 X |
| 671,516 | 4/1901 | Hegner . |
| 698,065 | 4/1902 | Sims ................................. 15/141.1 |
| 781,917 | 2/1905 | Smith ............................... 416/70 |
| 1,140,341 | 5/1915 | Johnston et al. . |
| 1,227,327 | 5/1917 | Sheaffer ........................... 416/76 |
| 1,627,314 | 5/1927 | Boynton ........................... 416/76 |
| 1,627,315 | 5/1927 | Boynton ........................... 416/76 |
| 1,925,638 | 9/1933 | Killman et al. . |
| 2,278,398 | 3/1942 | Wittmann . |
| 2,670,938 | 3/1954 | Wittmann . |
| 2,798,702 | 7/1959 | Fjellstedt . |
| 2,836,402 | 5/1958 | Barnes et al. ................... 366/129 X |
| 2,906,510 | 9/1959 | Harris . |
| 4,380,192 | 4/1983 | Doren . |
| 5,037,210 | 8/1991 | Bliss . |

FOREIGN PATENT DOCUMENTS

| 0187208 | 7/1986 | European Pat. Off. . |
| 934575 | 5/1948 | France . |
| 442144 | 3/1927 | Germany . |
| 658555 | 10/1951 | United Kingdom . |
| 706803 | 4/1954 | United Kingdom . |

Primary Examiner—David Scherbel
Assistant Examiner—Charles E. Cooley
Attorney, Agent, or Firm—Notaro & Michalos

[57] ABSTRACT

A device for manually whisking liquids or semi-liquids consists of a rod, to the end of which are individually attached torroidal coils of stainless steel fixed to the rod by wire loops twisted to tightness. Annular grooves are formed in the rod to provide longitudinal abutments for the coils and the end of the rod may protrude beyond the coils and be domed to provide a bearing. The head of the device is immersed in the liquid to be treated and is spun by rolling the rod between the palms of the user's hands to rotate the device at high speed to agitate and froth the liquid.

6 Claims, 1 Drawing Sheet

U.S. Patent
Jan. 9, 1996
5,482,367
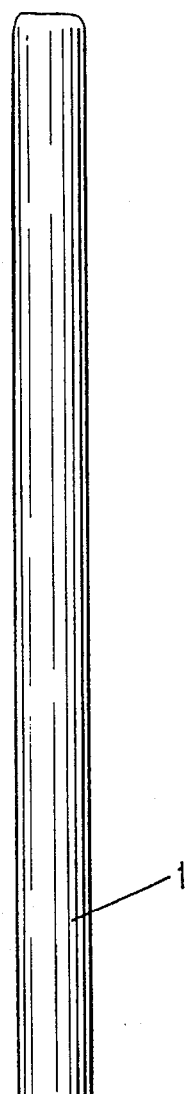
FIG. 1
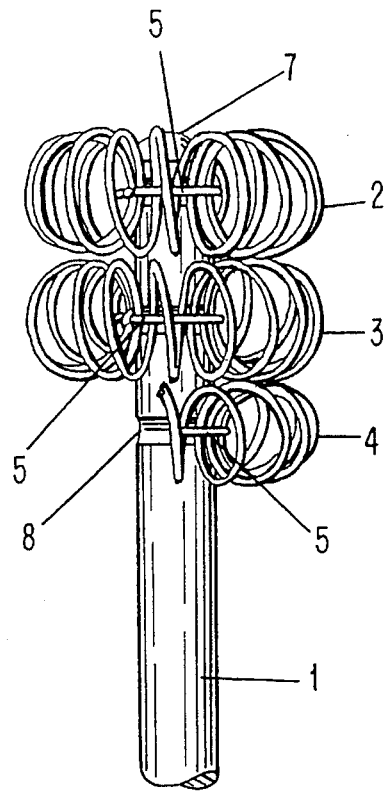
FIG. 2
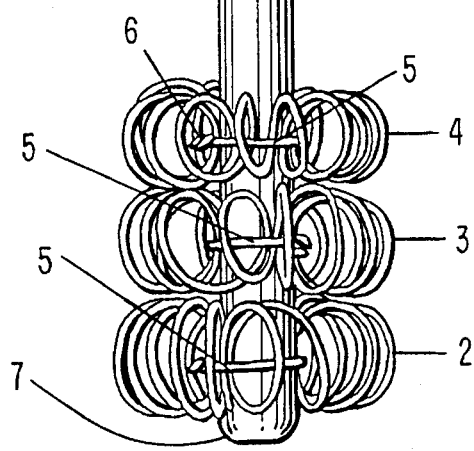

WHISKING DEVICE WITH ROD AND PLURAL TORROIDAL COILS

FIELD AND BACKGROUND OF THE INVENTION

This invention relates to devices for manually whisking liquids or semi-liquids such as for example milk, egg whites or salad dressings into a frothy or otherwise mixed condition. The use of such devices enables suitable liquids or semi-liquids to be completely aerated, such as whipped egg white, partially aerated, such as hot milk for cappuccino coffee, or simply well blended or homogenised, such as salad dressings.

Such whisking devices have been known for many years. Today, devices powered by electric motors are common, and manual whisking devices are not as much in favour as they were twenty or thirty years ago. One reason for this is that manual devices have not been particularly easy to use or to clean. Another reason is that devices for single-handed use have not been particularly effective, and have required concerted wrist action for a substantial length of time to attain a satisfactorily high degree of frothing.

A traditional device for single-handed operation consists of a plurality of stainless steel loops joined at their ends in a coiled steel handle. However, as mentioned above, a good deal of practice and of wrist strength is required before the device can be used to anything approaching satisfaction.

A device for double-handed use was proposed in GB706803. It consists of a plurality of metal coils fixed to the base of a rotatable shaft, rotation being achieved by means of a cog mounted on the upper end of the shaft and driven by a crown wheel worked by a handle. Devices of this general kind have been common, but they suffer from the following drawbacks.

Firstly, they consist of a number of moving and fixed parts which have to be manufactured and then assembled. This makes them costly. Secondly, they are not particularly easy to operate and can be quite tiring to the hands. Thirdly, they have many surfaces which are virtually inaccessible for cleaning and drying purposes. Fourthly, their ungainly shape and size makes for inconvenience in storage.

SUMMARY OF THE INVENTION

It is an object of this invention to provide a manual whisking device which is much simpler in construction than the prior art devices described, making for lower manufacturing costs. A further object is to provide a device which is considerably easier for a user to operate. A further object is to provide a device which is easier to clean and dry than prior art devices of the kind described above.

According to the invention there is provided a manual whisking device comprising:

(a) an elongate rod of wood, plastics, metal or similar material, said rod being of uniform circular cross section over at least a substantial part of its length and the diameter of the cross section being such that the rod can be comfortably spun at high rotational speed when held between the palms of a user by counterwise linear palm movement; and (b) a plurality of toroidal coils of metallic or non-metallic wire fixed to one end of the rod and adapted in use to aerate a liquid or semi-liquid by the forwards and backwards rotation of the said rod.

We have discovered that surprising efficiency of aeration rate may be achieved by a device according to the invention. Part of this is due to the rotation speed of the rod which can be generated simply by, effectively, rubbing the two palms together with the rod interposed between. The smaller the diameter of circular cross-sectional part of the rod, the greater will be the rotational speed, and vice versa. However if the diameter is too small, the device will be difficult to operate as the hands will rub together over part of their surfaces. Equally, if the diameter is too great, the rotational speed will be slowed, and more passes of the lands will be needed to obtain the same result.

We have found that the diameter is preferable in the range of 11 mm to 15 mm, most preferably around 13 mm.

Preferably, the rod is of uniform circular cross section throughout its length, which is preferable in the range of 35 cm to 45 cm, ideally about 40 cm.

The toroidal coils of wire may be fixed to the rod in any suitable way, but we provide as a preferred feature of the invention that they are fixed by simple loops of wire passed around the part of the coils which abut the rod and are then twisted to tightness. If the rod is wooden, then the coils will indent the wood slightly on tightening and this will achieve the necessary degree of fixing against rotational and linear movement. If however the rod is of harder material, such as acrylic plastics or metal, then annular grooves may be provided to receive the said coils to provide abutments against linear riding of the coils along the rod.

As to the toroidal coils themselves, in a preferred embodiment there are three. The uppermost coil in use may be somewhat smaller in diameter than the lower two in order to reduce surface activation and possible splashing of the liquid or semi-liquid being treated. 1 mm diameter stainless steel is an ideal material for the wire of the coils, preferably formed into coils whose diameter is in the order of 19 mm for the lower two coils and the order of 17 mm for the upper coil, before the coils are bent round into toroidal shape.

The lower end of the rod may protrude slightly from the coils so as to bear upon the base of the container holding the liquid or semi-liquid. This avoids scratching of the container. Further, the end of the rod may be domed, to reduce friction and thereby facilitate spinning.

BRIEF DESCRIPTION OF THE DRAWINGS

In order that the invention may be readily understood, certain embodiments thereof will now be described by way of example with reference to the accompanying drawings in which:

FIG. 1 is an elevational view of a whisking device according to the invention; and FIG. 2 is a partially cut away view of a modified embodiment.

DESCRIPTION OF THE PREFERRED EMBODIMENT

Referring firstly to FIG. 1, there is shown a device for manually whisking liquids or semi-liquids consisting of a wooden rod 1 which is smooth and is of uniform circular cross-section throughout its length to define an axis. The diameter of the rod is approximately 13 mm, and its length to define an axis is in the order of 40 cms.

Fixed to one end of the rod and spaced along the rod are three non-intermeshing toroidal coils stainless steel wire numbered respectively 2, 3 and 4. The wire is approximately 1 mm in diameter and is formed into the toroidal coils with approximately 17 loops. The coils abut the rod and are fastened to the rod by means of loops 5 of stainless steel wire passed around the part of the coils 2, 3, 4 which abut the rod and which are twisted to tightness. One of the twists is shown particularly well at 6, and the twists may be made either manually with pliers, or by machine.

It will be seen that the end of the rod 7 protrudes slightly beyond the coils, and is dome-shaped.

In use, the liquid or semi-liquid to be whisked is placed in a container, and the head of the whisk consisting of the wire coils is immersed in the liquid or semi-liquid. The device is then spun at high rotational speed backwards and forwards by counterwise linear movement of the palms of the user, between which the rod is held. The domed end 7 of the rod bears upon the base of the container and ensures that the rod can be spun easily as well as that the coils 2 are spaced from and therefore do not scratch the base of the container.

A slightly modified embodiment of the invention is shown in FIG. 2, which is similar to the embodiment of FIG. 1 except for two respects.

Firstly, the end 7 of the rod does not protrude beyond the coils 2. Secondly, as this embodiment is for use where the rod 1 is of a harder material than wood, such as acrylic plastics or steel, there are provided annular grooves 8 in which the toroidal coils 2, 3, 4 sit and in which they are forcibly urged by the tightening of the fixing loops 5. This provides a longitudinal abutment for the coils 2, 3, 4 which prevents them riding along the rod 1.

While the embodiments described above have their toroidal coils made of stainless steel, other materials, such as plastics or fiber-reinforced plastics may be suitable. It will also be noted that coil 4 is of slightly reduced diameter (typically about 15 mm) than coils 2 and 3, which are typically about 19 mm in diameter. Each of the coils 2, 3, 4 is individually attached to the rod by means of the wire loops 5.

The invention is particularly suitable for frothing hot milk in order to make cappuccino coffee. Rolling the device between the palms of the hands for the surprisingly short amount of time of 10 to 15 seconds can produce milk frothed to the desired consistency. Other applications of the device are the frothing of cold milk and soft icecream to make milk shake drinks, frothing combinations of milk and eggs to make frothy omelette mixture, and combining vinegar and oil to make vinaigrette salad dressing. Egg whites may be whipped to make meringues. Equally egg yolks and oil may be homogenised to make mayonnaise.

It will thus be appreciated that the invention makes for a whisking device of considerably simpler structure and therefore less expensive manufacture than the prior art. However, owing to the wire coils and the fact that surprisingly high speeds can be obtained by rolling the device between the palms of the hand, the device is of surprisingly high efficiency. Furthermore, it will be noted from the drawings that virtually all surfaces are accessible by brush, and the device therefore is particularly easy to keep clean. Also, virtually all surfaces are well exposed to the air, which aids in prompt drying.

The invention claimed is:

1. A device for manually whisking liquids and semi-liquids, comprising: an elongate rod having a uniform circular cross-section over at least a substantial part of its length and defining an axis, the cross-section having a diameter such that the rod can be comfortably spun at high rotational speed when held between a user's palms, by counterwise linear movement of the palms; agitating means fixed to one end of the rod for aerating a liquid or semi-liquid by forward and backward rotation of the rod; the agitating means comprising a plurality of non-intermeshing torroidal coils of wire having axes which are substantially coaxial with the axis of the rod, said torroidal coils being adjacent each other and spaced along the length of the rod at the one end of the rod, each coil being independently fixed around and abutting the rod by a respective loop of wire which extends around a part of each coil which abuts the rod, each loop of wire having portions that are twisted to each other to tightly hold the coils to the rod.

2. A device according to claim 1, wherein the one end of said rod includes annular grooves therein to receive the coils and to provide abutments against linear movement of the coils along the rod.

3. A device according to claim 1, wherein the rod is of uniform circular cross-section throughout its length.

4. A device according to claim 1, including three of the torroidal coils on the rod.

5. A device according to claim 1, wherein a lower end of the rod is at said one end and protrudes beyond the coils so as to form a bearing for engagement with a container for holding the liquid or semi-liquid.

6. A device according to claim 5, wherein the lower end of the rod is domed.

* * * * *